(12) United States Patent
Astl et al.

(10) Patent No.: US 7,480,918 B2
(45) Date of Patent: *Jan. 20, 2009

(54) DUPLICATE MESSAGE ELIMINATION DURING RECOVERY WHEN MULTIPLE THREADS ARE DELIVERING MESSAGES FROM A MESSAGE STORE TO A DESTINATION QUEUE

(75) Inventors: Kenneth L. Astl, San Antonio, TX (US); Subramanyam Agraharam Gooty, Fremont, CA (US); Arul Sundaramurthy, Pleasanton, CA (US); Kai Mike Zhang, West Linn, OR (US)

(73) Assignee: International Business Machines Corporation, Armonk, NY (US)

( * ) Notice: Subject to any disclaimer, the term of this patent is extended or adjusted under 35 U.S.C. 154(b) by 607 days.

This patent is subject to a terminal disclaimer.

(21) Appl. No.: 11/061,282

(22) Filed: Feb. 18, 2005

(65) Prior Publication Data

US 2006/0200829 A1   Sep. 7, 2006

(51) Int. Cl.
*G06F 9/44* (2006.01)
(52) U.S. Cl. ...................... 719/314; 718/100
(58) Field of Classification Search .................. 719/310, 719/313, 314, 315, 318; 718/1, 100; 709/223, 709/224
See application file for complete search history.

(56) References Cited

U.S. PATENT DOCUMENTS

| 4,509,851 | A | 4/1985 | Ippolito et al. |
| 4,589,093 | A | 5/1986 | Ippolito et al. |
| 4,689,739 | A | 8/1987 | Federico et al. |
| 5,384,565 | A | 1/1995 | Cannon |
| 5,745,685 | A | 4/1998 | Kirchner et al. |
| 5,978,940 | A | 11/1999 | Newman et al. |
| 5,987,432 | A | 11/1999 | Zusman et al. |
| 5,996,001 | A | 11/1999 | Quarles et al. |
| 6,256,676 | B1 | 7/2001 | Taylor et al. |
| 6,401,136 | B1 * | 6/2002 | Britton et al. ............... 719/314 |
| 6,529,921 | B1 | 3/2003 | Berkowitz et al. |
| 6,615,383 | B1 | 9/2003 | Talluri et al. |
| 7,058,955 | B2 * | 6/2006 | Porkka ....................... 719/314 |

(Continued)

OTHER PUBLICATIONS

U.S. Appl. No. 10/364,738, filed Feb. 11, 2003, entitled "Duplicate Message Elimination System for a Message Broker", invented by K.M. Zhang, K.L. Astl, S.A. Gooty, & A.P. Sundaramurthy.

*Primary Examiner*—Van H Nguyen
(74) *Attorney, Agent, or Firm*—David W. Victor; Konrad Raynes & Victor LLP

(57) ABSTRACT

Provided is a method for duplicate message elimination A plurality of message threads process operations to deliver messages from a message store to a destination queue. An in-doubt list is generated identifying messages that are in-progress of being delivered from the message store to the destination queue by the message threads. One message thread processing one message adds an entry including the message identifier to a monitor queue. The message thread further adds the message to the destination queue. A recovery thread is generated in response to detecting a failure in the processing by the threads to deliver the messages from the message store to the destination queue. The recovery thread processes the messages indicated in the in-doubt list and compares with message identifiers in the monitor queue to prevent duplicate delivery of messages to the destination queue.

8 Claims, 5 Drawing Sheets

U.S. PATENT DOCUMENTS

| | | |
|---|---|---|
| 2001/0032232 A1 | 10/2001 | Zombek et al. |
| 2001/0034791 A1 | 10/2001 | Clubb et al. |
| 2001/0037358 A1 | 11/2001 | Clubb et al. |
| 2002/0031101 A1 | 3/2002 | Petite et al. |
| 2002/0052968 A1 | 5/2002 | Bonefas et al. |
| 2002/0160805 A1 | 10/2002 | Laitinen et al. |
| 2003/0040955 A1 | 2/2003 | Anaya et al. |
| 2003/0046035 A1 | 3/2003 | Anaya et al. |
| 2003/0055768 A1 | 3/2003 | Anaya et al. |
| 2003/0097327 A1 | 5/2003 | Anaya et al. |
| 2003/0126077 A1 | 7/2003 | Kantor et al. |
| 2003/0126229 A1 | 7/2003 | Kantor et al. |
| 2003/0163544 A1 | 8/2003 | Wookey et al. |
| 2003/0167223 A1 | 9/2003 | Pledereder et al. |
| 2005/0278410 A1 * | 12/2005 | Espino ...................... 709/201 |

* cited by examiner

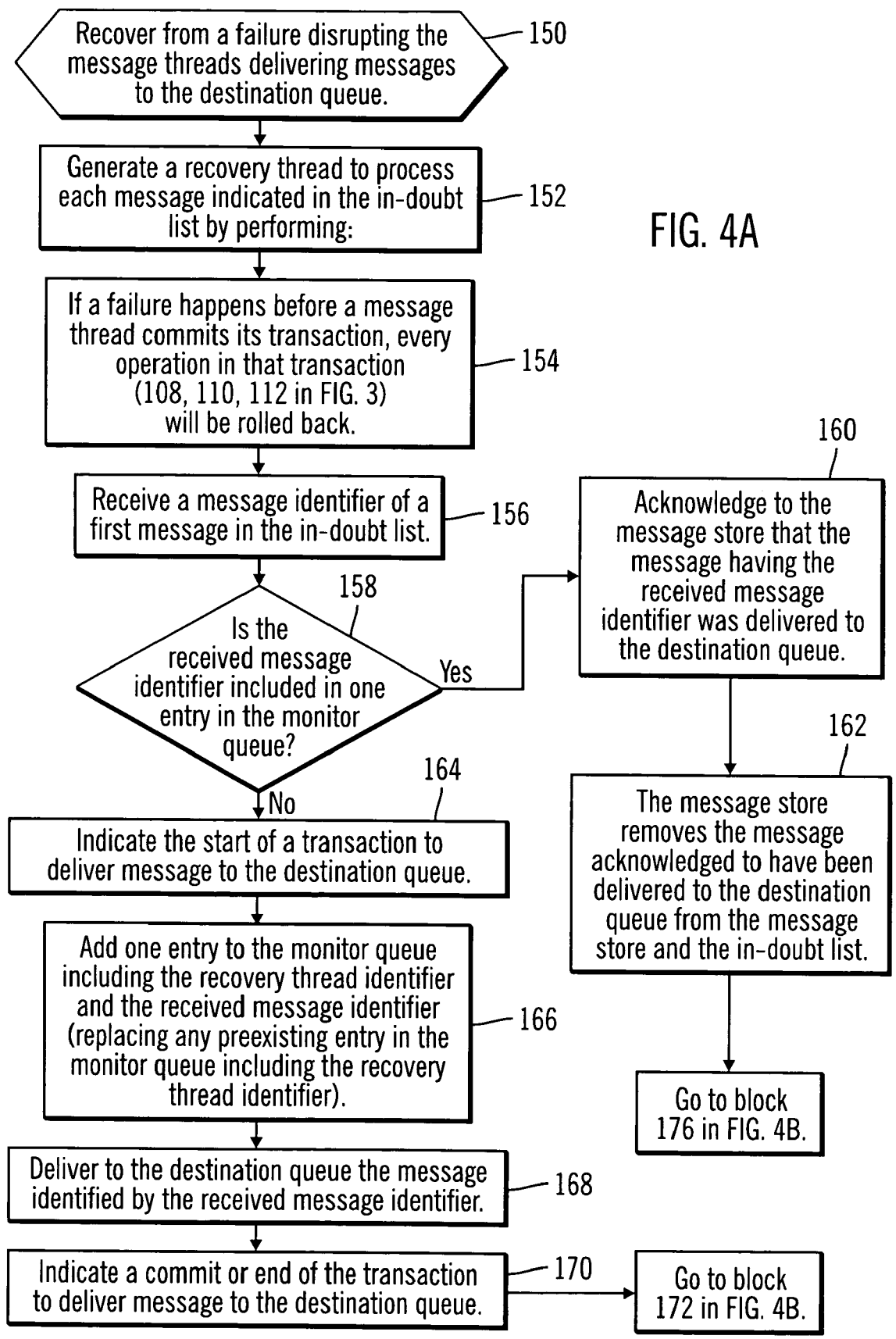

DUPLICATE MESSAGE ELIMINATION DURING RECOVERY WHEN MULTIPLE THREADS ARE DELIVERING MESSAGES FROM A MESSAGE STORE TO A DESTINATION QUEUE

BACKGROUND OF THE INVENTION

1. Field of the Invention

The present invention relates to duplicate message elimination during recovery when multiple threads are delivering messages from a message store to a destination queue.

2. Description of the Related Art

In a message system environment, an agent may handle the delivery of messages from a message store to a message broker. A message being delivered is indicated in a monitor queue and then added to a destination queue. Once the message is committed to the destination queue, the entry in the monitor queue for the committed message replaces the entry in the monitor queue for the previous message and an acknowledgment (ACK) is sent to the message store. The message store then removes the delivered message from the message store.

In the event of a failure, messages that have not been committed to the destination queue are rolled back from the destination queue and the indication of the message is removed from the monitor queue, so that the previous message that was successfully committed is indicated in the monitor queue. The agent then determines, for each message for which acknowledgment has not been received, whether the identifier for the message is in the monitor queue. If so, acknowledgment is returned to the message store because the message has already been delivered. If there is no message identifier in the monitor queue matching the message being considered, then the message is redelivered to the message broker. The details of this recovery process are further described in the copending and commonly assigned patent application "Duplicate Message Elimination System for a Message Broker", U.S. application Ser. No. 10/364,738, filed Feb. 11, 2003, which application is incorporated herein by reference in its entirety.

SUMMARY

Provided are a method, system, and program for duplicate message elimination. A plurality of message threads process operations to deliver messages from a message store to a destination queue. An in-doubt list is generated identifying messages that are in-progress of being delivered form the message store to the destination queue by the message threads. One message thread processing one message adds an entry including the message identifier to a monitor queue. The message thread further adds the message to the destination queue. A recovery thread is generated in response to detecting a failure in the processing by the threads to deliver the messages from the message store to the destination queue. The recovery thread processes the messages indicated in the in-doubt list and compares with message identifiers in the monitor queue to prevent duplicate delivery of messages to the destination queue.

BRIEF DESCRIPTION OF THE DRAWINGS

FIGS. 4a and 4b illustrate an embodiment of operations to recover from a failure disrupting the delivery of messages to a message broker.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
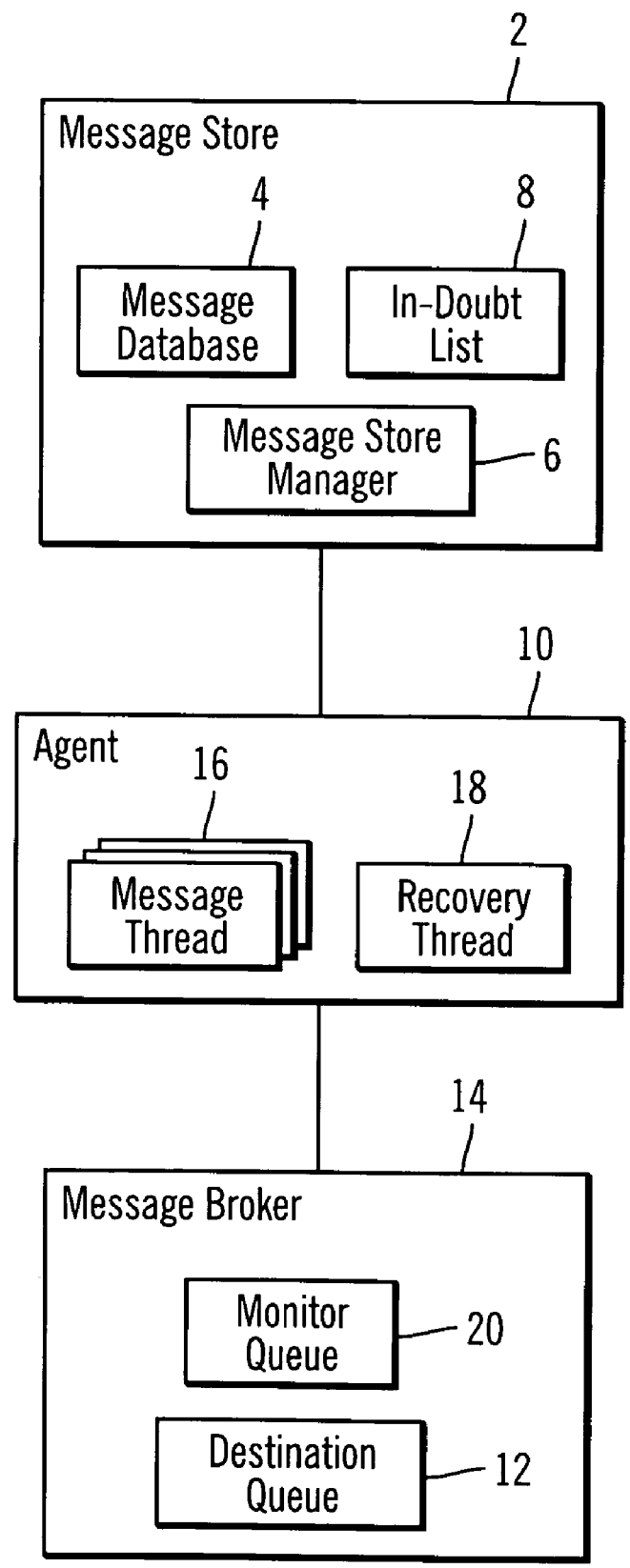
FIG. 1 illustrates an embodiment of a message system.

FIG. 1 illustrates an embodiment of a message computing environment. A message store 2 includes a message database 4 maintaining messages, such as email messages, events, workflow processes or packages, a message store manager 6 managing the messages in the message database 4, and an in-doubt list 8 indicating messages that have been delivered to an agent 10 to add to a destination queue 12 in a message broker 14, but not yet acknowledged as having been committed to the destination queue; 12. The agent 10 spawns a plurality of message threads 16, where each message thread 16 processes one message to transfer the message from the message database 4 to the destination queue in the message broker 14. In the event of a failure resulting in an interruption of the message threads 16 transmitting messages from the message store 2 to the message broker 14, the agent 10 spawns a recovery thread 18 to ensure processing of messages in the in-doubt list 8, i.e., those not yet acknowledged as having been committed to the destination queue 12, in a manner that avoids duplicate messages being sent to the destination queue 12. The agent 10 further includes a monitor queue 20 indicating messages that have been committed to the destination queue 12.

The data store 2, agent 10 and message broker 14 may be implemented in separate or the same computer systems, such as in one or more servers. If the components 2, 10, and 14 are distributed in different systems, then they may be connected by a network. In one embodiment, the data store 2 comprises a message store in a persistent storage system for storing source messages (events). The data store 2 may be implemented as a Java Messaging Service (JSM) queue, a database table, a file-based store, or any other form of storage that is suitable for this purpose. In another embodiment, the message broker 14 may be implemented with messaging products, like JMS products and IBM® WebSphere® messaging products. (IBM and WebSphere are registered trademarks of IBM). Those skilled in the art will appreciate that the described messaging system may be implemented in different messaging or computational systems, and transaction enabled brokers.

Figure 2:
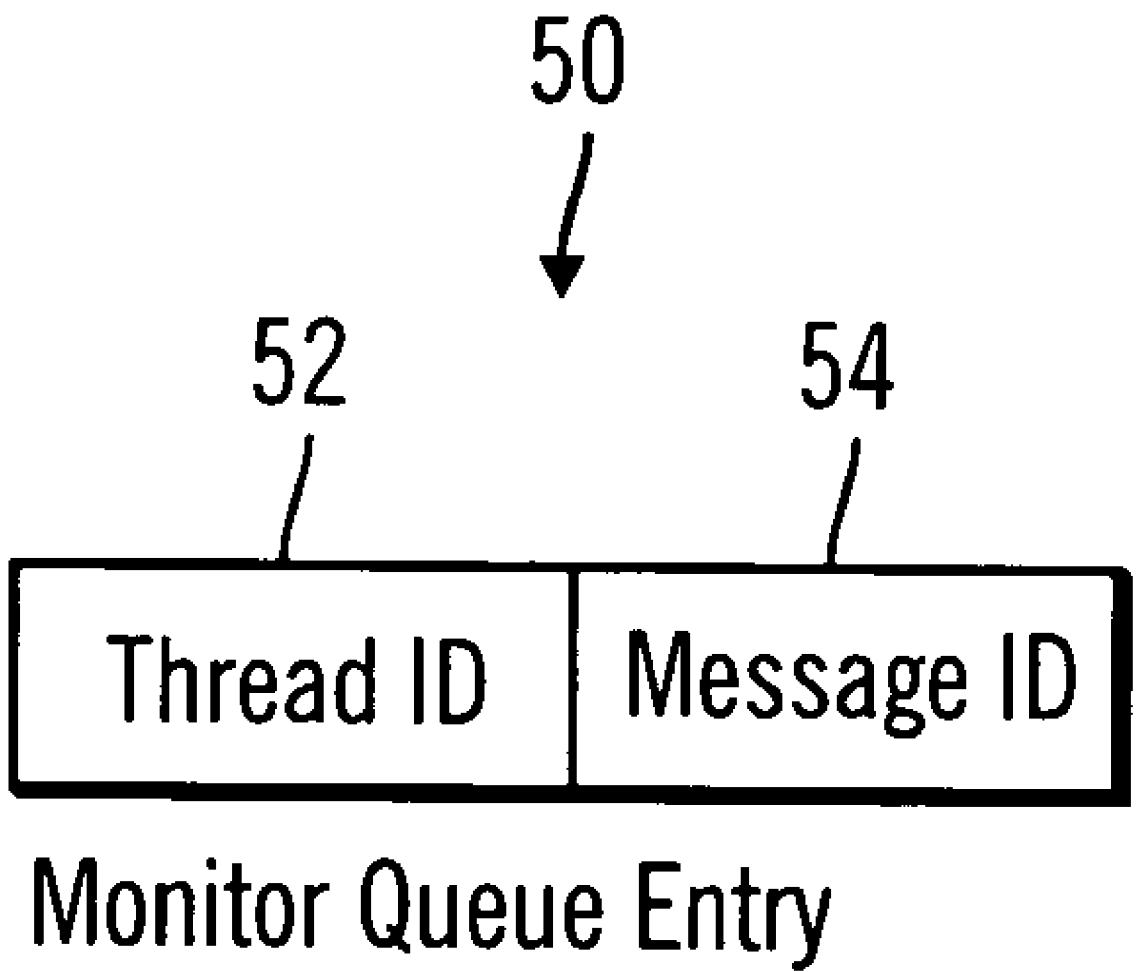
FIG. 2 illustrates information included with an entry in a monitor queue for messages delivered to a destination queue.

FIG. 2 illustrates an embodiment of a monitor queue entry 50 added by one thread 16 processing one message to the monitor queue 20. In one embodiment, there may be only one entry in the monitor queue 20 for each thread. Each monitor queue entry 50 includes a thread identifier 52 identifying the thread 16 adding the entry 50 and a message identifier 54 of the message that the identified thread is delivering to the destination queue 12.

Figure 3:
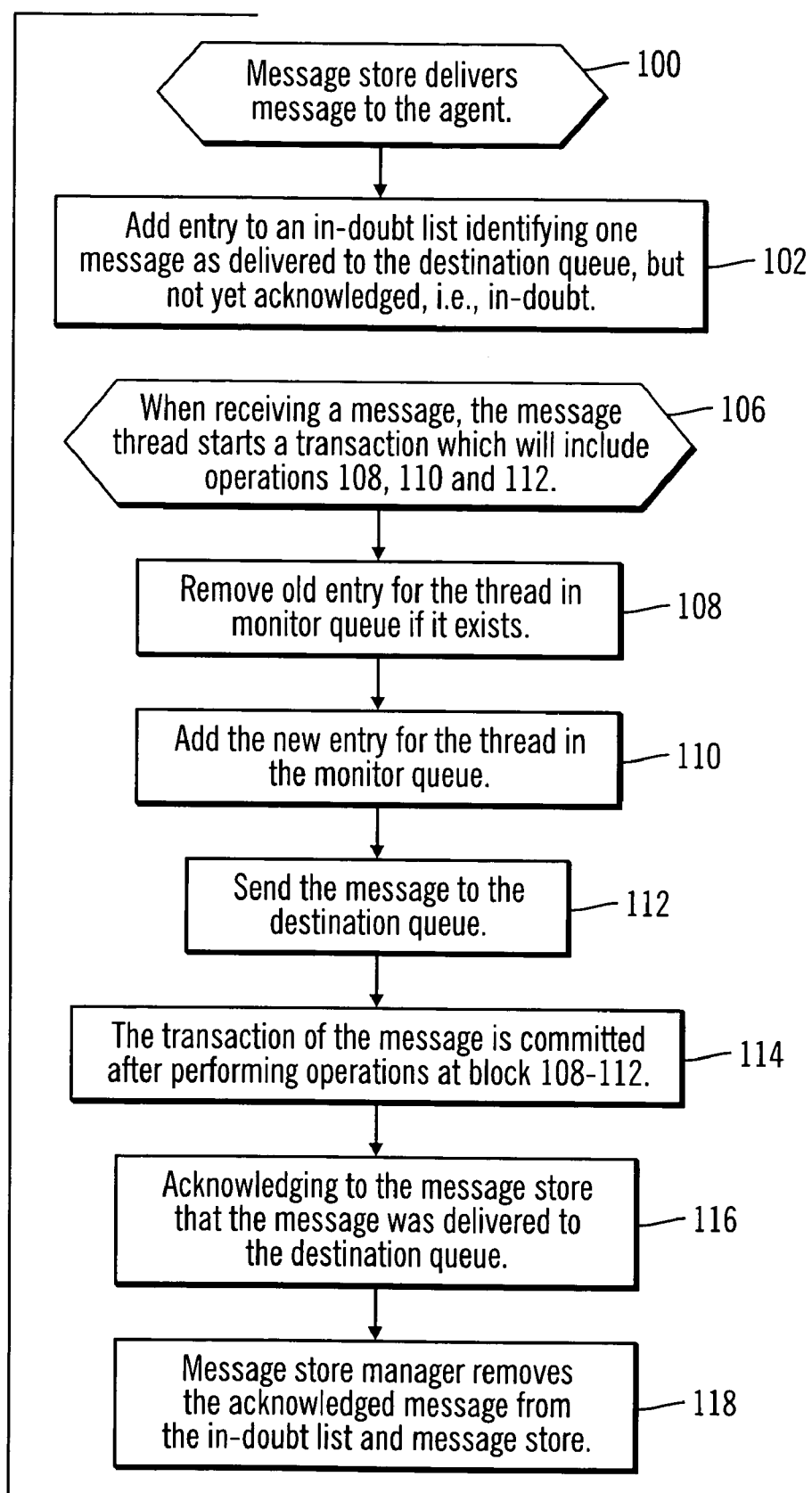
FIG. 3 illustrates an embodiment of operations to deliver messages from multiple threads to a message broker.

FIG. 3 illustrates an embodiment of operations performed by the message store manager 6 and agent 10 to transfer one message from the message database 4 to the destination queue 12. The message store manager 6 initiates the process by delivering (at block 100) a message to the agent 6 to transfer to the message broker 14. The message store manager 6 then adds (at block 102) an entry to the in-doubt list 8 identifying the message as delivered to the destination queue 12, but not yet acknowledged, i.e., "in-doubt". In one embodiment, the message identifier is removed from the in-doubt list 8 when the message is acknowledged to the message store 2 as having been committed to the destination queue 12.

Upon the agent 10 receiving the message from the message store 2, the agent 10 spawns (at block 106) one message thread 16 to start a transaction to deliver the received message to a destination queue 12 in the message broker 14. The operations at blocks 108, 110, and 112 are then performed as part of a unit of work that must be completed for the transaction to commit. The message thread 16 removes (at block 108) an old entry for the thread, i.e., having the thread ID 52 (FIG. 2), in the monitor queue 20 if it exists. The message thread 16 then adds a new entry (at block 110) for the thread to the monitor queue 20, thus, replacing a previous entry for the message thread 16 in the monitor queue 20. Thus, there is one entry in the monitor queue 20 for each message thread 16. The message is then sent (at block 112) to the destination queue 12. After successfully completing the operations at blocks 108, 110 and 112, the transaction of the message is committed (at block 114), such that the operations of blocks 108, 110, and 112 are performed as part of a single transaction or unit of work. In this way, the entire operation fails if the message is not confirmed as committed to the destination queue 12. A "commit" of the message to the destination queue 12 may occur after the message is written to the destination queue 12 and logged. In the event of a failure before the message is committed to the destination queue 12, the current message will be rolled back from the destination queue 12 if delivered there and the current message identifier will be rolled back from the monitor queue 20 so that the monitor queue entry for the previous message identifier and identified thread is restored to the monitor queue 20.

After the message is committed to the destination queue 12, the message thread acknowledges (at block 116) to the message store 2 that the message was delivered to the destination queue 12. The message store manager 6 then removes (at block 118) the acknowledged message from the in-doubt list 8 and message store database 4 to avoid having duplicate copies of the messages maintained in both the message broker 14 and the message store 2.

Figure 4B:
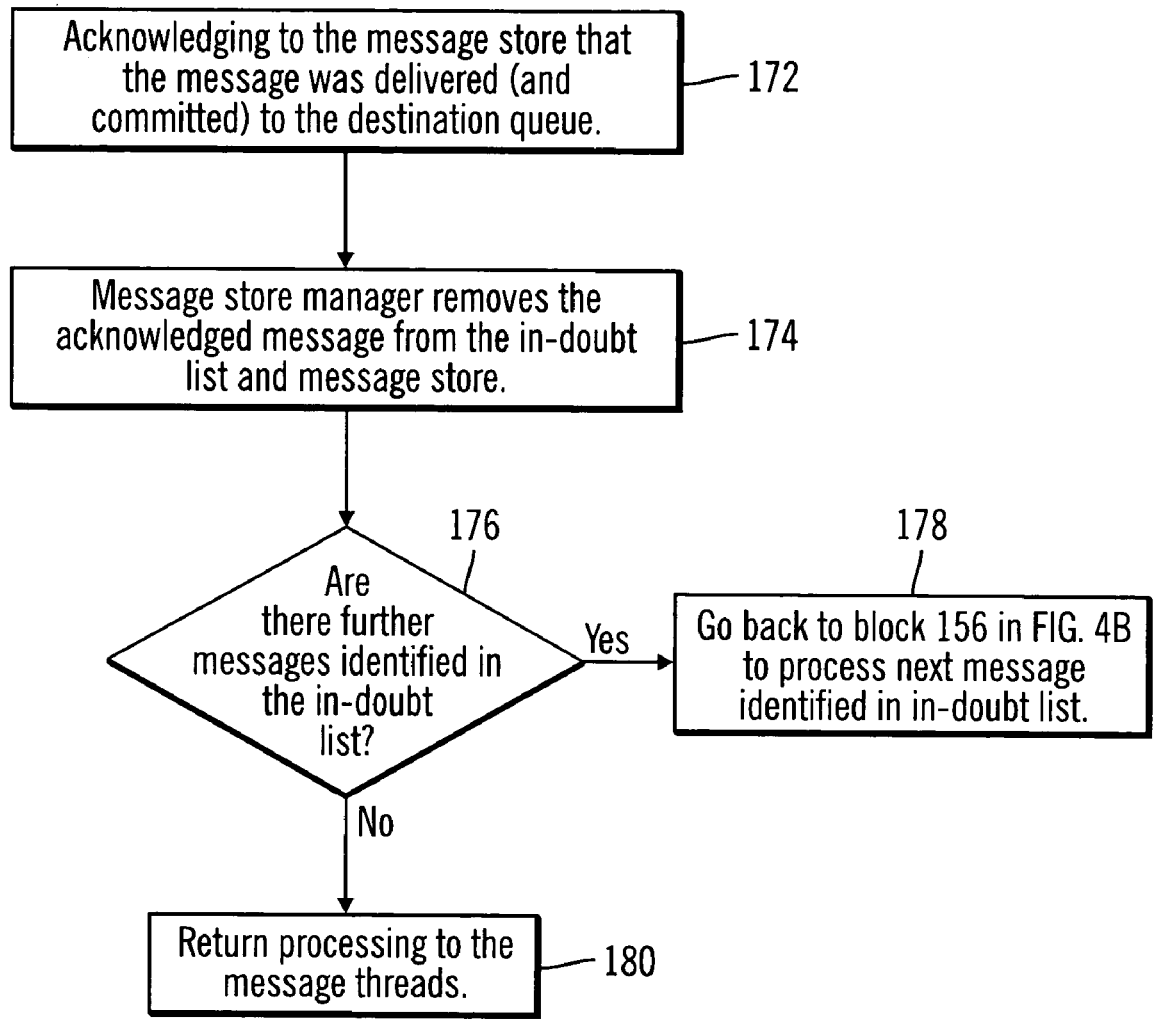

FIGS. 4a and 4b illustrate an embodiment of operations performed by the recovery thread 18 in response to a recovery from a failure, where different of the executing message threads 16 may be performing different of the operations described with respect to FIG. 3 when the failure occurs. In response (at block 150) to recovering from a failure, the agent 10 spawns a recovery thread 18 (at block 152) to process each message indicated in the in-doubt list 8. Thus, the recovery thread 18 sequentially processes for redelivery messages handled by different message threads 16 before the failure and recovery. A failure from the store manager 6, agent 10 and/or broker 14 may result in rollback (at block 154) of any incomplete transactions. That is, if a failure happens before a message thread commits its transaction, every operation in that transaction will be rolled back. In this case, this in-doubt message should be delivered to the destination queue 12 during recovery. However if a failure happens after committing a transaction but before acknowledging to the message store 2, this in-doubt message should not be redelivered to the destination queue 12 during recovery. A "rollback" involves replacing indication of the current message that did not successfully commit to the previous message for the thread that did commit. The "rollback" operation is performed by a system recovery process that may be a separate thread from the recovery thread 18.

When the recovery thread 18 receives (at block 156) a message from the in-doubt list 8, if (at block 158) the received message identifier from the in-doubt list 8 is included in one entry 50 in the monitor queue 20, then the message was committed to the destination queue 12. In such case, acknowledge (ACK) is sent (at block 160) to the message store 2 indicating that the message having the received message identifier was delivered to the destination queue 12. In response, the message store manager 6 (or the recovery thread 18) removes (at block 162) the message acknowledged to have been delivered (and committed) to the destination queue 12 from the message store message database 4 and the in-doubt list 8.

If (at block 158) the received message identifier from the in-doubt list 8 is not included in the monitor queue 20, then the message was not delivered to the message broker 14. In such case, the recovery thread 18 indicates (at block 164) the start of a transaction to deliver message to the destination queue 12. One entry 50 is added (at block 166) to the monitor queue 20 including the recovery thread identifier and the received message identifier, which would replace any preexisting entry in the monitor queue 20-including the recovery thread identifier. In this way, only one entry 50 is maintained in the monitor queue 20 indicating the recovery thread identifier. The operation to commit the message to the destination queue 12, is performed at blocks 164 and 166. At block 168, the message is delivered to the destination queue 12 and committed as discussed with respect to FIG. 3. The recovery thread 18 may further indicate (at block 170) a commit or end of the transaction to deliver message to the destination queue 12. After committing the message to the destination queue 12, the recovery thread 18 acknowledges (at block 172 in FIG. 4b) to the message store 2 that the message was delivered (and committed) to the destination queue 12. The message store manager 6 then removes (at block 174) acknowledged message from the in-doubt list 8.

If (at block 158) the received message identifier from the in-doubt list 8 is included in the monitor queue 20, then the message was delivered to the message broker 14. In such case, the message is not redelivered to the destination queue 12 so as not to make a duplicate copy of the message in the queue 12. The recovery thread 18 returns (at block 160) acknowledge (ACK) to the message store 2 that the message having the received message identifier was delivered to the destination queue 12. The message store 2 removes (at block 162) the message acknowledged to have been delivered to the destination queue 12 from the message store database 4 and the in-doubt list 8. 100201 After completing the handling of the message at the top of the in-doubt list 8 and returning acknowledgment at block 162 or 172, if (at block 176) there are further messages in the in-doubt list 8, then control proceeds (at block 178) to block 156 to receive the next message at the top of the in-doubt list 8 to process. Otherwise, if (at block 176) the in-doubt list 8 is empty, indicating that there are no more messages for the recovery thread 18 to consider, then processing is returned (at block 180) to the message threads 16 to continue delivering messages from the message store 2 to the message broker 14. When the recovery thread ends, it may remove its entry from the monitor queue 20.

Described embodiments provide a technique for recovering from a failure that occurred while multiple threads were delivering messages from a message store 2 to a message broker 14 in a manner that avoids duplicate messages from being added to the message broker 14 or maintained in both the message store 2 and message broker 14.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, the monitor and destination queues are part of a message broker. In alternative embodiments, the monitor and destination queues may be part of components other than a message broker. Further, an entity other than a separate agent may handle the spawning of message threads and the recovery thread to deliver messages from a message store to a destination queue.

The illustrated operations of FIGS. 4a and 4b show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

processing, by message threads, operations to deliver messages from a message store to a destination queue, wherein one message thread processes one message;

generating an in-doubt list identifying messages by message identifiers that are in-progress of being delivered from the message store to the destination queue by the message threads;

adding, by each of the message threads processing messages, an entry including the message identifier to a monitor queue, wherein the monitor queue indicates messages delivered to the destination queue;

sending, by the message threads, the messages to the destination queue;

generating a recovery thread in response to detecting a failure in the processing by the message threads to deliver the messages from the message store to the destination queue; and processing, by the recovery thread, the message identifiers indicated in the in-doubt list and comparing with the message identifiers in the monitor queue to prevent duplicate delivery of messages already delivered to the destination queue by performing for each message in the in doubt list:

receiving the message identifier of a message in the in-doubt list;

determining whether the received message identifier is included in one entry in the monitor queue; and adding one entry to the monitor queue including the recovery thread identifier and the received message identifier in response to determining that the received message identifier is not included in one entry in the monitor queue; and reinitiating, by the recovery thread, the processing of the messages in the in-doubt list and comparing with message identifiers in the monitor queue to prevent duplicate delivery of messages to the destination queue in response to recovering from a failure that occurred while the recovery thread was processing messages indicated in the in-doubt list.

2. The method of claim 1, wherein the message added to the destination queue comprises a current message, wherein an entry in the monitor queue indicates a previous message identifier of a previous message processed by the message thread, further comprising:

replacing, by the message thread, the entry in the monitor queue for the previous message with the added entry including the message identifier of the current message in response to delivering the current message to the destination queue; and removing the message identifier for the current message from the monitor queue and returning the entry to the monitor queue including the previous message identifier in response to the failure occurring before the current message is committed to the destination queue.

3. The method of claim 1, wherein processing, by the recovery thread, the messages indicated in the in-doubt list and comparing with message identifiers in the monitor queue to prevent duplicate delivery of messages to the destination queue further comprises the recovery thread performing for each message in the in-doubt list:

receiving the message identifier of a message in the in-doubt list;

determining whether the received message identifier is included in one entry in the monitor queue; and acknowledging to the message store that the message having the received message identifier was delivered to the destination queue in response to determining that the received message identifier is included in one entry in the monitor queue, wherein the message store removes the message acknowledged to have been delivered to the destination queue from the message store and the in-doubt list.

4. The method of claim 1, wherein the recovery thread further performs for each message indicated in the in-doubt list:

delivering to the destination queue the message identified by the received message identifier in response to determining that that the received message identifier is not included in one entry in the monitor queue.

5. The method of claim 1, wherein the entry added to the monitor queue including the recovery thread identifier replaces any preexisting entry in the monitor queue indicating the recovery thread and a message identifier different from the received message identifier.

6. The method of claim 1, wherein the recovery thread further performs:

acknowledging to the message store that the message having the received message identifier was delivered to the destination queue in response to determining that the received message identifier is included in one entry in the monitor queue, wherein the message store removes the message acknowledged to have been delivered to the destination queue from the message store and the in-doubt list.

7. The method of claim 1, further comprising:

returning processing to the message threads in response to the recovery thread processing all messages indicated in the in-doubt list and delivering the messages indicated in the in-doubt list to the destination queue.

8. The method of claim 1, wherein the monitor and destination queues are in a message broker, and where an agent spawns message threads and the recover threads to deliver messages from the message store to the message broker.

* * * * *